(No Model.)
E. THOMSON.
METHOD OF ELECTRIC SOLDERING.
No. 480,392. Patented Aug. 9, 1892.
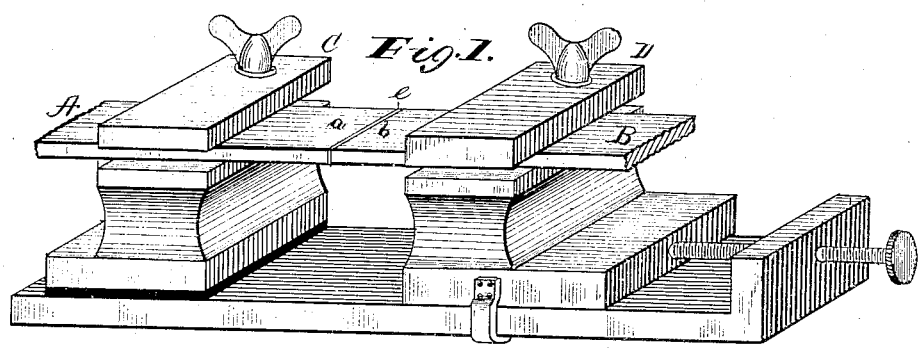
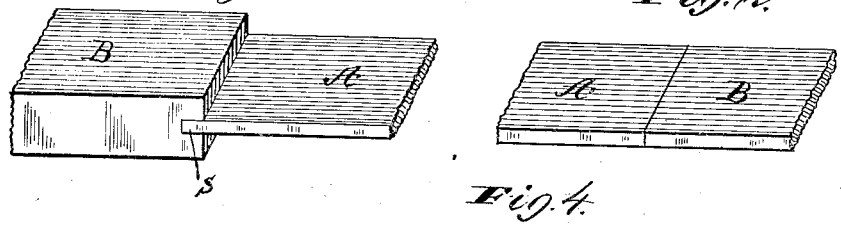
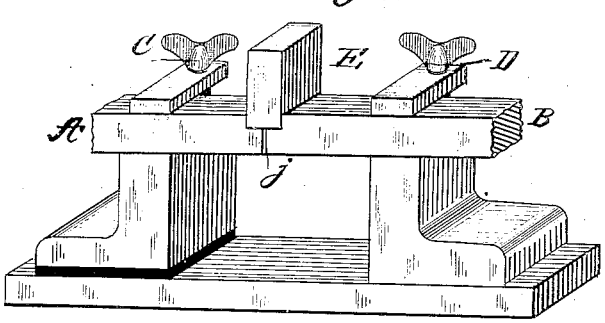
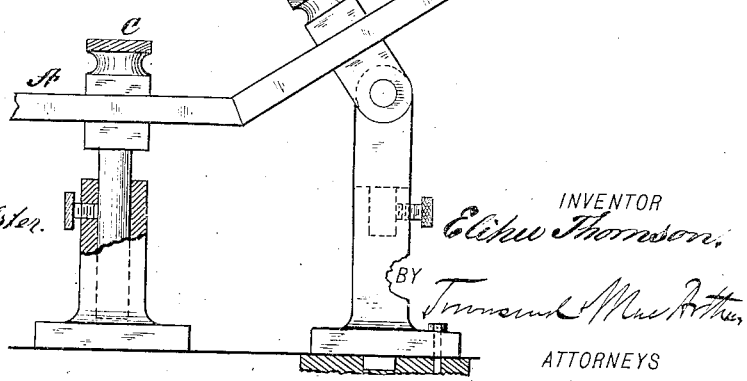
WITNESSES:
INVENTOR
Elihu Thomson,
BY
ATTORNEYS

UNITED STATES PATENT OFFICE.

ELIHU THOMSON, OF LYNN, MASSACHUSETTS, ASSIGNOR TO THE THOMSON ELECTRIC WELDING COMPANY, OF MAINE.

METHOD OF ELECTRIC SOLDERING.

SPECIFICATION forming part of Letters Patent No. 480,392, dated August 9, 1892.

Application filed August 22, 1887. Serial No. 247,507. (No specimens.)

*To all whom it may concern:*

Be it known that I, ELIHU THOMSON, a citizen of the United States, and a resident of Lynn, in the county of Essex and State of Massachusetts, have invented a certain new and useful Method of Electric Soldering and Brazing, of which the following is a specification.

My invention consists of a novel process of soldering or brazing metals by the aid of heavy electric currents or currents of large volume, and has for its object the formation of strong and durable joints in shorter periods of time and with less labor and expense than in the methods of soldering and brazing at present in use.

The characteristic feature of the invention is the heating internally of the pieces of metal to be united by the passage of an electric current through them. In the ordinary methods of soldering and brazing the metals are heated by means of heat applied to the outside surface of the metals or by applying the heat to the solder; but in my electrical process the metals are heated from within toward the outside surfaces by the electric current which is passed through the body of the pieces to be united, thereby heating the whole internal structure. This confers great advantages in soldering or brazing, because the flow of solder to the interior parts of the joint is more certain to occur, and consequently a more perfect and secure joint is the result. Besides, the application of heat externally may injure delicate projections or edges on the surfaces, liability to which is avoided in the preferred manner of carrying out my invention, owing to the fact that the heating is more intense near the center of the joint to be made, and at which place the greater part of the current is apt to pass.

Briefly my invention consists in suitably preparing the pieces to be united, passing the heavy electric current through the material at the joint to raise it to a temperature which will readily melt the solder, applied as in ordinary soldering or brazing operations, and, if necessary, when the solder is melted by conduction of the heat from the heated pieces shaping the joint to a desired form, thereby completing the joint. My invention may be applied to the formation of butt-joints between metal tubes or pipes, also to the formation of joints between bars or strips of metal. In making a joint of this kind after the pieces have been rubbed bright at the places to be abutted, so that dirt and dust may be removed and the abutting points left clean, they are clamped or held in the position in which it is desired to have them joined, a small piece or disk of solder being placed between them, and the current is then sent through the pieces transversely to or in the direction of the plane of the joint and the abutted ends thereby raised to a suitable temperature at least high enough to readily melt the solder, and the joint is thus completed. Any of the soldering materials used in ordinary soldering or brazing operations may be employed.

My electric soldering process may be carried out in other ways, and I do not by any means limit myself to the precise procedure above described. The solder may be applied to the joint before, during, or after the time the current is passing through the materials to be joined.

Instead of proceeding in the exact manner before mentioned, the pieces to be united may be first raised to a suitable temperature and the solder then applied and the joint formed and completed while the current is passing through the pieces, or the pieces to be joined may be raised to a suitable temperature, the current switched off, and the solder applied and the joint formed and completed while the metal is cooling, or the joint may be formed by combinations of two or more of such special methods.

The invention consists, broadly, in the novel art or process of soldering by internally heating the pieces of metal to be joined by the passage through them of an electric current of sufficient volume to cause the same to be heated to a soldering temperature, the soldering material being applied before, during, or after the flow of the current and the joint, if desired, formed or shaped in any desired manner.

My invention may be applied to the formation of joints between pieces of different kinds of metals whose melting and welding temperatures are widely different—as, for instance, lead and iron, brass and steel.

One method of effecting joints of this kind may be briefly described as follows: An electric current is passed through one (preferably the most fusible one) of the pieces, such current being heavy enough to at least raise the piece to a temperature which will melt solder easily and quickly. Suitable solder is applied to the heated piece and is thereby melted. The piece or pieces of metal to be joined to the already-heated piece are then applied to the molten solder and any excess of solder removed. The pieces may be then allowed to cool, when the joint will be found to be perfect. This method may be varied in several ways. The solder may be applied to the pieces to be united before, during, or after the time the current is passing through them. The pieces may be applied one to the other before the solder is applied and before, during, or after the time the current is on, and in still other ways the method may be varied to suit the conditions of the case. It may also be desirable to heat all the pieces to be joined. This may be done electrically or one or any number may be heated electrically and the others by means of a flame or furnace.

The particular method of carrying out my invention, consisting in passing the current through the piece directly instead of passing it across the joint, forms the subject of claims in another application for patent filed by me August 22, 1887, Serial No. 247,509, and is therein claimed as applied to either brazing or welding operations.

My invention is further applicable to the formation of joints composed of more than two pieces of metal. Such joints may be formed very readily by heating each piece to be united and then applying solder to them at their parts of abutment, or two pieces may be heated by electricity, the solder applied to the joint, and the other piece or pieces applied while the solder is in a molten condition, or the procedure varied in other ways.

In the accompanying drawings, Figure 1 represents an apparatus that may be employed in carrying out my invention. Fig. 2 represents the pieces shown in Fig. 1 as joined. Fig. 3 illustrates two pieces formed from dissimilar metals joined. Fig. 4 illustrates the manner of joining three metals in a common joint. Fig. 5 shows forms of clamps that may be used for holding the pieces to be joined.

Fig. 1 illustrates the operation of forming a butt-soldered joint by my electric soldering process. The pieces of metals A B are placed in suitable clamps C D, which are insulated from one another and are connected with a suitable source of electric current—as, for instance, in the manner described in my prior patent, No. 347,140, August 10, 1886. A small strip, layer, disk, or piece of solder $e$ is placed between the abutted ends $a\,b$ of the bars and the current is turned on. The ends $a\,b$ of the bars A B heat up quickly through the material and across the joint and the piece of solder $e$ is melted, thus uniting the pieces.

Fig. 2 represents a complete joint made in this way. The devices for clamping or holding the pieces to be soldered may be arranged so as to permit motion of the pieces in any direction, thus allowing the pieces to be placed in any desirable position with relation to each other. Such devices are well known to all capable mechanics and may resemble those which govern the movements of tool-posts on lathes. They need not, therefore, be dwelt upon any further in this specification. Such clamps may be made movable up and down or sidewise or in rotary directions or all these combined. All that is required is to provide means for placing the pieces in juxtaposition, so that when soldered, brazed, or united in accordance with my invention they shall occupy the position they are required to occupy after the union is effected. Fig. 5 represents one arrangement of such a set of clamps. The clamp C has a movement up and down, as well as a rotary movement, while the clamp D has a swinging as well as a sidewise movement. The bars or pieces A B can thus be placed in any desired position with relation to one another.

Fig. 3 represents two metal pieces joined together whose welding and melting temperatures are widely different, thereby precluding a simple welding or making it difficult. The piece of metal—brass, for instance—B is heated to a suitable temperature by passing an electric current through it. Solder is applied to the slot S and is melted by conduction of heat. The piece A is then fitted into the slot and the pieces are allowed to cool.

Fig. 4 represents three pieces of metal united in a common joint. A B are two pieces of metal placed in the clamps C D and heated at the joint $j$ to a temperature that will melt solder. The piece of metal E and suitable solder is applied to the joint and the pieces are allowed to cool. Of course in making joints of this kind the pieces to be united should be prepared so as to fit together nicely.

The many advantages of this process of soldering or brazing metals over the ordinary flame and furnace methods are obvious. In the first place my process is much more economical of heat, for the reason that in it the heat is confined to a small portion of the pieces to be united and is all used in heating the pieces, whereas in the ordinary methods much heat is generated that is not used in melting the solder; secondly, the time required to make strong and durable joints is much shorter, for the reason that the heating of the pieces is merely the matter of a second or two, and this is also an element lessening the cost of soldering by my process; thirdly, the method will give more durable and uniform joints, for the reason that the heating takes place from the inside instead of from the outside of the pieces to be united, and therefore if the surfaces of the pieces are nicely soldered it follows that the inside must be also, whereas in making a soldered joint by the ordinary methods the surface may be well united, while the interior is not united at all. Other advantages of my process over the ordinary methods will be apparent in practice.

What I claim as my invention is—

1. The herein-described improvement in soldering or brazing, which consists in generating heat in the body of the piece or pieces of metal to be united through the resistance of the material to the passage of an electric current through it, such current being of volume sufficient to develop the determinate or required soldering or brazing temperature.

2. The herein-described improvement in soldering or brazing, which consists in generating heat in the body of the pieces to be joined through the resistance to the passage of an electric current through the pieces and from one to the other across the point of junction as and for the purpose described.

Signed at Lynn, in the county of Essex and State of Massachusetts, this 18th day of August, A. D. 1887.

ELIHU THOMSON.

Witnesses:
 GEORGE STUART,
 OTIS K. STUART.